United States Patent [19]
Bosniack

[11] 3,917,895
[45] Nov. 4, 1975

[54] FLUORINATED POLYOLEFIN LAMINATES BONDED WITH AN ASPHALT-ATACTIC POLYPROPYLENE MIXTURE

[75] Inventor: David S. Bosniack, Baytown, Tex.

[73] Assignee: Exxon Research & Engineering Co., Linden, N.J.

[22] Filed: Sept. 14, 1973

[21] Appl. No.: 397,484

Related U.S. Application Data

[63] Continuation-in-part of Ser. No. 245,389, April 19, 1972, abandoned.

[52] U.S. Cl. ......... 428/421; 156/337; 260/28.5 AS; 428/468; 428/489
[51] Int. Cl.² ................. B32B 11/08; B32B 11/04
[58] Field of Search ....... 117/92; 156/337; 161/189, 161/224, 236; 260/28.5 AS

[56] References Cited
UNITED STATES PATENTS

| | | | |
|---|---|---|---|
| 2,533,501 | 12/1950 | Pendleton et al. | 161/189 X |
| 3,144,423 | 8/1964 | Belak et al. | 260/28.5 AS |
| 3,312,157 | 4/1967 | Coscia | 260/28.5 AS X |
| 3,317,447 | 5/1967 | Black et al. | 260/28.5 AS |

*Primary Examiner*—Charles E. Van Horn
*Assistant Examiner*—Robert A. Dawson
*Attorney, Agent, or Firm*—James E. Reed

[57] ABSTRACT

Polytetrafluoroethylene and similar fluorinated polyolefins are bonded to substrates by coating the polyolefin and substrate surfaces with a blend of asphalt and polypropylene and thereafter contacting the coated surfaces under pressure. This method results in a surprisingly strong bond and permits the application of fluorinated polyolefins to steel and other materials at significantly lower costs than methods available in the past.

4 Claims, No Drawings

FLUORINATED POLYOLEFIN LAMINATES BONDED WITH AN ASPHALT-ATACTIC POLYPROPYLENE MIXTURE

CROSS-REFERENCE TO RELATED APPLICATIONS

This application is a continuation-in-part of application Ser. No. 245,389, filed in the U.S. Patent Office on Apr. 19, 1972.

BACKGROUND OF THE INVENTION

1. Field of the Invention

This invention relates to the manufacture of laminated articles containing fluorinated polyolefins and is particularly concerned with the bonding of polytetrafluoroethylne and related materials to steel and other substrates.

2. Description of the Prior Art

Because of their low friction characteristics and other mechanical properties, their inert behavior in the presence of a wide variety of chamicals, solvents and staining agents, and their resistance to weathering, polytetrafluoroethylene, polychlorotrifluoroethylene, polyvinyl fluoride, polyvinylidene fluoride and similar fluorinated polyolefins have been widely used as coating and laminating materials. The properties which make these materials useful for application of this type also make them very difficult to bond to most substrates. This is particularly true in the case of polytetrafluoroethylene. The low friction properities and inert characteristics of this material preclude the use of conventional adhesives and require that other bonding techniques such as spray coating, high temperature laminating, and plasma spraying be used. These techniques are generally considerably more expensive than those used for the bonding of other thermoplastic materials, usually require that the surface of the substrate be pretreated prior to the bonding operation, often result in bonds which do not possess the required strength and may tend to fail prematurely, and cannot be employed with certain substrate materials because of the high termperatures and other extreme conditions used in the bonding operations. Efforts to develop statisfactory adhesives for use with fluorinated polyolefins which will overcome these difficulties have in the past been largely unsuccessful.

SUMMARY OF THE INVENTION

The present invention provides a method for the bonding of polytetrafluoroethylene and other fluorinated polyolefins which largely eliminates the difficulties outlined above. In accordance with the invention, it has now been found that polytetrafluoroethJene and other fluorinated polyolefins can be effectively bonded to a wide variety of substrates and to one another by coating the surfaces to be bonded with a blend of from about 20 to about 80 weight percent asphalt and from about 80 to about 20 weight percent atactic polypropylene and thereafter contactng the coated surfaces with one another under elevated pressure. Tests have shown that such asphalt-atactic polypropylene blends have a much greater ability to wet and adhere to fluorinated polyolefins than do other materials used as adhesives in the past and that this ability permits the formation of fluorinated polyolefin-substrate bonds which are surprisingly strong and resistant to separation without the high temperatures and other disadvantages which have characterized bonding methods employed heretofore. Moreover, such blends exhibit little flow at elevated temperatures, have excellent electrical insulating properties, posses good ductility, and have the ability to accept relatively large quantities of process oils,, fillers and other additive materials. They have relatively high ring and ball softening points and are relatively nontacky. These properties and the relatively low cost of the materials make them useful for the bonding of polytetrafluoroethylene and other fluorinated polyolefins to steel, wood, plastic, aluminum, and other substrates for a wide variety of different applications.

DESCRIPTION OF THE PREFERRED EMBODIMENTS

The polypropylene employed for purposes of the invention is normally prepared by the stereospecific polymerization of propylene mononer in the presence of a catalyst containing a coordination complex of a transition metal halide and an aluminum alkyl or similar organometallic compound. The product from this reaction is a slurry of polypropylene and catalyst in a hydrocarbon diluent. A low molecular weight alcohol or similar agent is generally added to the slurry to quench the reaction, precipitate crystalline or isotactic propylene, and solubilize the catalyst. The amorphous or atactic polypropylene remains in solution in the diluent. Subsequent steps of the process generally involve recovery of the precipitated isotactic polypropylene, neutralization of the active catalyst, and recovery of the alcoholic solution and hydrocarbon diluent. The isotactic polypropylene is generally recovered as a high purity polymer suitable for use in a wide variety of coating, casting and molding applications. The amorphous or atactic polypropylene employed for purposes of this invention is recovered from the remaining residue as an odorless, off-white, tacky thermoplastic material. This material may constitute about 10% of the total polypropylene product.

The asphalts employed for purposes of the invention are highly viscous hydrocarbon materials obtained from natural sources or as residual products from petroleum refining operations such as steam distillation and vacuum distillation. Such materials are made up of components having molecular weights within the range of about 300 to 5000 or higher. They generally contain from about 7 to about 85% carbon, from about 7 to about 12% hydrogen, and include small amounts of nitrogen, sulfur and oxygen. Saturated hydrocarbons, aromatic hydrocabons and hydrocarbon resins containing heterocyclics, sulfur, nitrogen and oxygen compounds are usually present. Those components which have molecular weights above about 1500 and are insoluble in pentane and hexane are normally referred to as asphaltenes. The asphalts employed for purposes of the invention will generally have penetration values between about 20 and about 500 as determined by ASTM Method D5-25. Penetration values between about 30 and about 230 are normally preferred. The asphalts will generally have softening points as determined by ASTM Method D36-36 between about 25°C. and about 150°C., preferably between about 30°C. and about 60°C.

The asphalts employed for purposes of the invention may be modified by blowing air through the material at temperatures between about 300° and 500 F. if desired. This increases the hardness of the materials and tends to make them more plastic. Asphalts treated with sulfur, sulfur-containing materials or halogen-containing materials in order to increase their consistency may also be employed. In general, however, these materials are somewhat more expensive than straight-run asphalts and hence the latter are normally preferred.

The asphalt-atactic polypropylene compositions can be prepared by blending the materials at elevated temperatures. The asphalt and atactic polypropylene may be mixed at a temperature betwen about 250°F. and about 500°F., preferably between about 250 and about 350°F., and then any additives to be employed can be added to the resultant molten blend with stirring as necessary. It is generally preferred that the mixing be conducted under an inert atmosphere of nitrogen or similar gas in order to avoid undue oxidation of the materials. Conventional blending equipment may be employed. After the blending has been completed, the product is permitted to cool and is then packaged, pumped into an insulated tank car or similar container for shipment, or employed in the particular bonding application for which it is intended.

Additives which may be incorporated in the asphalt-attactic polypropylene blends, either during the blending stage or by subsequent compounding, include tackifiers conventionally used in adhesive compositions, antioxidants, fillers such as limestone, fiberglass and asbestos, elastomers, other polymers, process oils, and the like. A wide variety of different additives have been employed in asphalt-polyolefin compositions employed for other purposes and can be used in the fluorinated polyolefin bonding agents if desired.

The asphalt-atactic polypropylene blends prepared as described above can be used in accordance with the invention as adhesives for the bonding of polytetrafluoroethylene and other fluorinated polyolefins to stainless steel, aluminum, brass and other metals, wood, paper, polyolefins and other plastics, rubber, leather, asbestos board, Masonite, fiberglass, Transite and the like. The blends can be employed in various physical forms including films, liquids, tapes, putties, pellets of various shapes, granules, rods or ropes, and tapes or ribbons. They can be applied to the surfaces to be bonded by brushing, extruding, flowing, gravity feed coating, immersion, knife coating, roller coating, spraying or by means of pressure guns.

The blends are particularly useful for the manufacture of laminated products containing an outer layer of polytetrafluoroethylene or a similar fluorinated polyolefin and one or more inner layers of metal, wood, plastic, paper or the like. In some cases the blends may also be used for the bonding together of two or more layers or plies of fluorinated polyolefin. As pointed out above, earlier methods for bonding polytetrafluoroethylene and similar materials to substrates required high temperature surface etching or other sophisticated techniques and were quite expensive. The asphalt-atactic polypropylene blends not only eliminate the necessity for using such techniques but also permit bonding of the fluorinated polyolefins to substrates which could not be employed heretofore because of the bonding conditions which were required. This makes possible the preparation of new laminated products which take advantage of the unique chemical and mechanical properties of fluorinated polyolefins and permits substantial reductions in the cost of laminated products available heretofore.

A typical bonding technique for the formation of a laminated product prepared from polytetrafluoroethylene or a similar fluorinated polyolefin and a substrate involves the placing of the asphalt-atactic polypropylene blend between the fluorinated polyolefin and the substrate and the exertion of sufficient pressure to secure the proper thickness and bonding. Excellent bonds can be obtained over a wide range of pressures between about 100 psi and about 2000 psi, preferably between about 500 psi and about 1500 psi. The asphalt-polypropylene blend can be employed at room temperature or used as a hot melt adhesive. In hot melt applications, it is preferred that the adhesive composition be at a temperature sufficiently above its melting point that good flow and contact will be obtained. The temperature selected should be such that it does not exceed the char or liquefaction temperature of the substrate to which the fluorinated polyolefin is to be laminated. Generally speaking, the bonding time may range from about 5 seconds or so up to about 1 hour or more. Bonding times of from about 60 seconds to about 3 minutes are normally preferred. If the substrate to which the fluorinated polyolefin is to be bonded is an effective thermal conductor, it may be heated to prevennt extensive cooling of the adhesive material by this is generally not essential. The quantity of adhesives generally used will range from about 1 to about 50 weight percent of the finished product, preferably from about 1 to about 5% by weight. The amount used will depend in large part, of course, upon the particular substrate to which the fluorinated polyolefin is to be bonded and may be varied as necessary. Hot melt bonding techniques in which the adhesive is handled in solid form until just prior to application and then melted in any of a variety of ways and applied to the substrate are effective and may be employed.

The asphalt-atactic polypropylene blends are characterized by very little flow at elevated temperatures, by excellent electrical insulating properties, by good ductility, and by the ability to accept relatively large quantities of process oils and other additives without noticeable loss of sag properties and other desirable characteristics. The materials are relatively nontacky and can be modified by the addition of tackifiers and the like to acheive a broad range of desired properties. They have superior wetting abilities, good adhesive strengths, and are relatively low in cost. These and other characteristics make them useful for the bonding of polytetrafluoroethylene and other fluorinated polyolefins to a multitude of different substrates in order to take advantage of the chemical and mechanical properties of the fluorinated polyolefins.

The nature and objects of the inventions are further illustrated by the results of laboratory work carried out with various asphalt-polypropylene compositions.

EXAMPLE 1

In a first series of experiments, adhesive compositions were prepared by blending two different asphalts and two different commercial atactic polypropylenes. The physical properties of the compositions thus prepared were tested and the results obtained are set forth in Table I below.

TABLE I

| Constituent | Blend A | Blend B | Blend C | Blend D |
| --- | --- | --- | --- | --- |
| Asphalt 150/180 pen | 50 wt. % | 50 wt. % | | |
| Asphalt 61/70 pen | | | 50 wt. % | 50 wt. % |
| Atactic Polypropylene (Eastman M5L) | 50 wt. % | | 50 wt. % | |
| Atactic Polypropylene (Eastman M5H) | | 50 wt. % | | 50 wt. % |
| Ring & Ball Softening Pt., °F. | 200 | 208 | 200 | 208 |
| Brookfiekd vis, cps.   300°F | 4900 | 6150 | 5160 | 6830 |
| 325°F | 3170 | 4040 | 3160 | 4220 |

It will be noted from the above table that the blends prepared from the asphalt and atactic polypropylene had ring and ball softening points of from 200° to 208°F. and Brookfield viscosities at 300°F. of from 4900 to 6830 centipoises. At 325°F., the Brookfield viscosities range from 3160 to 4220 centipoises. These properties are satisfactory for use in various types of hot-melt equipment.

EXAMPLE 2

Following the tests described above, additional asphalt blends were prepared from an asphalt having a 230 penetration value and various types of polypropylene. The polypropylenes employed included a commercial atactic polymer, an isotactic polypropylene, and a reject polypropylene containing both atactic and isotactic polymer and inorganic salts. The softening point and viscosity of a blend prepared from equal parts of the asphalt and the atactic polypropylene were comparable to those shown in Table I above. Blends prepared from equal parts of the asphalt and the isotactic polypropylene and with 65% asphalt and 35% reject polypropylene has somewhat higher softening points and viscosities than that prepared with the atactic polymer. The composition of the various blends and the measured properties of each blend are shown in Table II below.

TABLE II

| Constituent | Asphalt-Polypropylene Blends | | | | |
| --- | --- | --- | --- | --- | --- |
| | Blend A | Blend B | Blend C | Blend D | Blend E |
| Asphalt 230 pen | 50 wt. % | 65 wt. % | 65 wt. % | 50 wt. % | 65 wt. % |
| Atactic Polypropylene (Eastman M5L) | 50 wt. % | 35 wt. % | 26.2 wt. % | | |
| Isotactic Polypropylene | | | 8.8 wt. % | 50 wt. % | |
| Reject Polypropylene — 49% amorphous 43% crystalline 8% salts | | | | | 35 wt. % |
| Softening point °F. (Ring & Ball) | 203 | 184 | 303 | 320 | 306 |
| Sag point °F. | 225 | 200 | 275 | 300 | 280 |
| Brookfield vis., cps, 350°F. | 990 | 610 | 850 | — | 5500 |

The blend of equal part of 230 penetration asphalt and atactic polypropylene which was prepared as described above was tested as an adhesive for polytetrafluoroethylene by placing a small quantity of the solid adhesive material between two polytetrafluoroethylene disks and applying about 1000 psig hydraulic pressure for 1 minute at a temperature of 77°F. The resultant sandwich obtained upon release of the pressure could not be pulled apart by hand. When sufficient force was exerted, the adhesive began to yield but the polytetrafluoroethylene adhesive bond did not break. As indicated in Table III below, lap shear tensile tests and T-peel tests of the laminated product showed that an excellent bond has been formed.

TABLE III

| Polytetrafluoroethylene Adhesive Data | |
| --- | --- |
| Asphalt-Atactic Polypropylene Adhesive Properties | |
| Softening point, R&B, °F. | 205 |
| Sag point (ER&E), °F. | 225 |
| Brookfield viscosity, cps | |
| at 300° F. | 2240 |
| 325° F. | 1450 |
| 350° F. | 990 |
| Lap shear tensile test, 0.05"/min., 77° F. | |
| Adhesive/Polytetrafluoroethylene | 284 psi |
| T-Peel test, 2"/min., 77° F. | |
| Adhesive/Polytetrafluoroethylene | 2.0 lbs. |

Tests similar to those reported above with blends of asphalt an isotactic polypropylene and asphalt and reject polypropylene showed that neither of these latter materials satisfactorily bonded the polytetrafluoroethylene.

EXAMPLE 3

Further tests were carried out using individual samples of 230 penetration asphalt and individual samples of atactic polypropylene in place of the asphalt-atactic polypropylene blend used in Example 2. In each case the bonding material selected was placed between two polytetrafluoroethylene disks, the disks were subjected to 1000 psig hydraulic pressure for one minute at a temperature of 77°F., and the effectiveness of the bond was determined. Where asphalt along was used as the bonding agent, it was found that the two disks would readily slide with respect to one another and that little or no bond was formed. In the case where atactic polypropylene alone was used, the tests showed that the discs would not readily slide but could be easily peeled apart, again indicating little or no bonding. When the blend of equal parts of the asphalt and atactic polypropylene was used, however, the tests demonstrated that a strong laminate highly resistant to both sliding and peeling resulted. The fact that the blend was an effective bonding agent even though neither of the individual constituents showed any utility for the bonding of polytetrafluoroethylene demonstrates the unexpected advantages of the method.

EXAMPLE 4

Still further tests to determine the ability of blends of asphalt and atactic polypropylene to bond polytetrafluoroethylene to metallic substrates were carried out. These tests showed that such blends can be used to effectively bond polytetrafluoroethylene to steel, aluminum and brass and that the resulting laminated articles possess surprisingly high strength. This use of asphalt-atactic polypropylene blends as bonding agents, in lieu of the expensive and complicated bonding techniques which have been employed heretofore, permits substantial reductions in the cost of laminated articles prepared with polytetrafluoroethylene and similar fluorinated polyolefins and makes possible the manufacture of new laminated articles that, because of the stringent bonding conditions required heretofore, could not be manufactured in the past.

I claim:

1. An improved laminated article which comprises a supporting substrate, an at least partial coating on said substrate of a blend of from about 20 to about 80 weight percent of an asphalt having an ASTM Method D5-25 penetration value between about 20 and about 500 and an ASTM Method D36-36 softening point between about 25° and about 150°C. annd from about 20 to about 80 weight percent of atactic polypropylene, and a layer of fluorinated polyolefin bonded to said substrate by said blend of asphalt and atactic polypropylene.

2. A laminated article as defined by claim 1 wherein said blend contains from about 65 to about 35 weight percent of said asphalt and from about 35 to about 65 weight percent of said atactic polypropylene.

3. A laminated article as defined in claim 1 wherein said asphalt has an ASTM Method D5-25 penetration value between about 30 and about 230.

4. A laminated article as defined in claim 1 wherein said substrate is a metal and said fluorinated polyolefin is polytetrafluoroethylene.

* * * * *